US008388037B2

(12) United States Patent
LaNore et al.

(10) Patent No.: US 8,388,037 B2
(45) Date of Patent: Mar. 5, 2013

(54) EXPANDABLE BARRIER

(75) Inventors: Larry J. LaNore, Dryden, MI (US);
Raymond D. Helferty, Chesterfield Township, MI (US)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/936,386

(22) PCT Filed: Apr. 2, 2009

(86) PCT No.: PCT/US2009/039275
§ 371 (c)(1),
(2), (4) Date: Oct. 4, 2010

(87) PCT Pub. No.: WO2009/124177
PCT Pub. Date: Oct. 8, 2009

(65) Prior Publication Data
US 2011/0025084 A1 Feb. 3, 2011

Related U.S. Application Data

(60) Provisional application No. 61/042,305, filed on Apr. 4, 2008.

(51) Int. Cl.
*B29C 44/18* (2006.01)
(52) U.S. Cl. ....................................... 296/1.06
(58) Field of Classification Search ............... 296/1.06, 296/187.02, 193.04; 277/314, 316; 428/71, 428/158; 264/46.1, 46.5, 46.6, 263, 266, 264/267, 343
See application file for complete search history.

(56) References Cited

U.S. PATENT DOCUMENTS

| | | | | |
|---|---|---|---|---|
| 5,212,208 A * | 5/1993 | Soderberg | ....................... | 521/96 |
| 5,344,208 A * | 9/1994 | Bien et al. | ................ | 296/187.02 |
| 5,506,025 A * | 4/1996 | Otto et al. | ....................... | 428/98 |
| 5,631,027 A * | 5/1997 | Takabatake | ................... | 425/4 R |
| 5,642,914 A * | 7/1997 | Takabatake | .............. | 296/187.02 |
| 5,678,826 A * | 10/1997 | Miller | ............................ | 277/316 |
| 5,766,719 A * | 6/1998 | Rimkus | .......................... | 428/71 |
| 5,806,915 A * | 9/1998 | Takabatake | .............. | 296/187.02 |
| 5,979,902 A * | 11/1999 | Chang et al. | ................... | 277/316 |
| 6,311,452 B1 * | 11/2001 | Barz et al. | ..................... | 296/207 |
| 6,347,799 B1 * | 2/2002 | Williams et al. | ............. | 277/316 |
| 6,491,336 B1 * | 12/2002 | Beckmann et al. | ...... | 296/187.01 |
| 6,519,854 B2 * | 2/2003 | Blank | ........................ | 29/897.1 |
| 6,880,657 B2 * | 4/2005 | Schneider et al. | ........... | 180/68.5 |
| 6,988,585 B2 * | 1/2006 | Mourieras et al. | ............ | 181/204 |
| 7,144,071 B2 * | 12/2006 | Le Gall et al. | ........... | 296/187.02 |
| 7,296,847 B2 * | 11/2007 | Czaplicki et al. | ........ | 296/187.02 |
| 7,479,246 B2 * | 1/2009 | Muteau et al. | ................ | 264/273 |

(Continued)

FOREIGN PATENT DOCUMENTS

DE 102005013934 A1 * 10/2006
EP 1362796 A2 * 11/2003

(Continued)

*Primary Examiner* — H Gutman
(74) *Attorney, Agent, or Firm* — Rader, Fishman & Grauer PLLC

(57) ABSTRACT

Disclosed are various embodiments of expandable barriers. Expandable barriers are typically barriers made from an expandable material and formed to fit within a cavity. After being placed inside a cavity, expandable barriers generally undergo an activation process, where the expandable barrier expands to fill the cavity and create a physical barrier. Using various extrusion processes to form an expandable barrier allows for a reduction in tooling costs, while also allowing more flexible barrier designs. Such designs can be specifically tailored for a particular cavity or cavities to ensure that the barrier fills the cavity after expansion.

13 Claims, 3 Drawing Sheets

U.S. PATENT DOCUMENTS

| | | | | |
|---|---|---|---|---|
| 7,597,382 B2 * | 10/2009 | Vilcek et al. | | 296/187.02 |
| 7,621,373 B2 * | 11/2009 | Helferty | | 181/268 |
| 7,838,100 B2 * | 11/2010 | McLeod et al. | | 428/172 |
| 7,887,724 B2 * | 2/2011 | Ui et al. | | 264/45.8 |
| 7,913,814 B2 * | 3/2011 | Duffin et al. | | 181/294 |
| 7,950,723 B2 * | 5/2011 | Vilcek et al. | | 296/187.02 |
| 8,079,146 B2 * | 12/2011 | Gray et al. | | 29/897.2 |
| 8,087,916 B2 * | 1/2012 | Kanie et al. | | 425/4 R |

FOREIGN PATENT DOCUMENTS

EP            1921121 A1 * 5/2008

* cited by examiner

EXPANDABLE BARRIER

CROSS-REFERENCE TO RELATED APPLICATIONS

This application claims the benefit of U.S. Provisional Patent Application Ser. No. 61/042,305, filed on Apr. 4, 2008, and International Application No. PCT/US2009/039275, filed on Apr. 2, 2009, the entirety of which is are hereby incorporated by reference.

BACKGROUND

Barriers are commonly used to seal orifices in certain objects. For example, barriers are commonly used in various parts of a motor vehicle to prevent noise, fumes, dirt, water, and the like from passing through from one area to another. A motor vehicle door panel typically has several small orifices in the sheet metal for manufacturing, assembly, and weight reduction reasons. Further, various structural components of motor vehicle bodies typically include a variety of orifices, hollow posts, cavities, passages, and openings that could allow contaminants into the passenger compartment.

SUMMARY

Disclosed are various expandable barriers. One example of an expandable barrier comprises an elongated body that is substantially rectangular. The barrier also includes a tab that is configured to releasably secure the body to a cavity wall by deforming and establishing an interference fit with the cavity wall. The body and the tab are integrally formed by extruding a thermoplastic expandable material.

DETAILED DESCRIPTION

Figure 1:
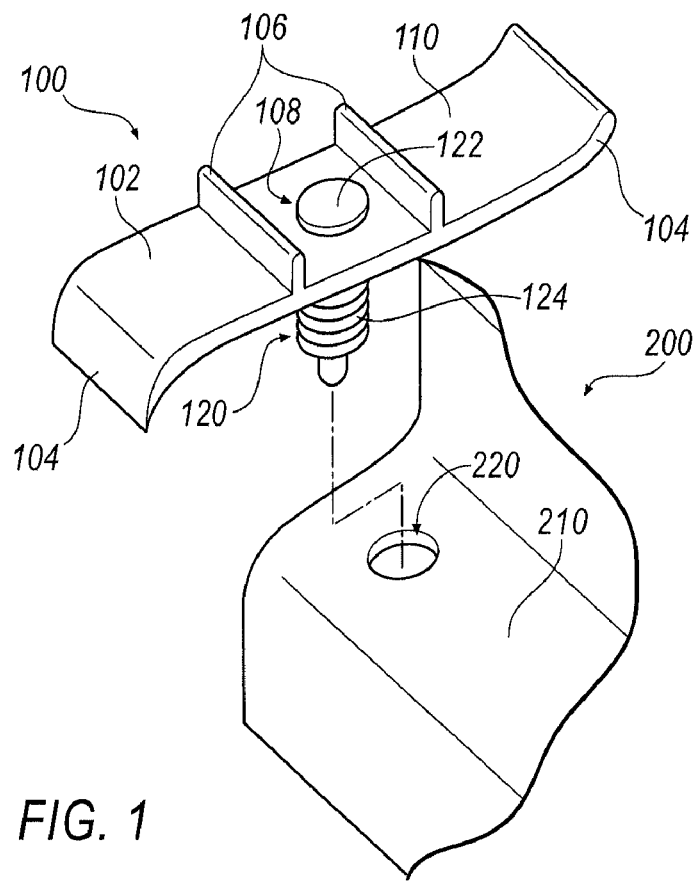
FIG. 1 is a perspective view of an expandable barrier with a mechanical fastener.

Disclosed are various embodiments of expandable barriers. Expandable barriers are typically barriers made from an expandable material and formed to fit within a cavity. After being placed inside a cavity, expandable barriers generally undergo an activation process, where the expandable barrier expands to fill the cavity and create a physical barrier. Many expandable barriers are developed using injection molding processes, such as 2-shot or over-molding. However, such injection molding processes are costly, time-consuming, and inflexible. For example, any design change typically requires expensive tooling changes and can require new tooling all together. Thus, in injection molding processes, it is very difficult and often expensive to make even minor design changes. However, utilizing various extrusion processes to form an expandable barrier allows for a reduction in tooling costs, while also allowing more flexible barrier designs. Such designs can be specifically tailored for a particular cavity or cavities to ensure that the barrier fills the cavity after expansion.

In addition, such designs can include various integrated attachment mechanisms that can be used to secure a barrier in a cavity without the use of a secondary, mechanical fastener. The disclosed systems and processes also allow for greatly enhanced design flexibility, where various features of a barrier can be easily modified. Using an extrusion system, adding, removing, or changing the length, shape, protrusions, fingers, ribs, etc. of an expandable barrier can be easily accomplished with minimal time, effort, and tooling costs. Such design flexibility allows extruded expandable barriers to efficiently fill cavities and also provide a highly effective physical barrier to prevent noise, fumes, dirt, water, and the like from passing through the cavity.

Such extruded barriers can be attached to a vehicle by adding a fastener, capturing the barrier part in weld seams, adding tabs to the sheet metal, or designing an integrated fastener that is extruded in the part design that can attach to a cavity wall. For example, a barrier can be secured within a cavity without the use of a secondary fastener, such as a metal or plastic tab, screw, pin, or the like. Eliminating the need for a secondary, mechanical fastener can significantly reduce part and material costs, reduce manufacturing costs, and reduce installation costs. Further, such designs can greatly increase part design flexibility, thereby allowing part changes without incurring tooling costs. In addition, eliminating a secondary fastener can significantly increase overall part quality by eliminating the need to assemble each part with a secondary fastener.

Generally, a thermoplastic expandable material is used to create such extruded expandable barriers. Thermoplastic expandable materials are generally materials that soften when heated and harden when cooled, and expand upon activation. Generally, such materials are activated using heat, although an expandable material can be activated by a chemical reaction, radiation exposure, microwave exposure, electricity, etc. One example of a suitable expandable material is a heat activated foam. For example, the Sika Corporation of Madison Heights, Mich., sells such thermoplastic expandable materials under the SIKABAFFLE® trade name, which are described in the following U.S. patents, all of which are incorporated herein by reference in their entireties: U.S. Pat. Nos. 5,266,133; 5,373,027; 6,150,428; 6,368,438; and 6,387,470. Other examples of materials that can be used are also provided by the Sika Corporation are SB-240, SB-255, SB-300, and SB-751. Other materials that are capable of undergoing the described extrusion process can also be used, including those that can expand from less than 100% to over 2000%.

FIG. 1 illustrates one example of an extruded expandable barrier 100. Expandable barrier 100 is a two-piece construction comprising an extruded body 102 and a mechanical fastener 120. Extruded body 102 is generally a one-piece extrusion made of a thermoplastic expandable material, as discussed above. As illustrated in FIG. 1, extruded body 102 is generally rectangular and includes several extrusion features, including flanges 104 and protrusions 106. As illustrated in FIG. 1, body 102 includes two curved flanges 104 that are positioned at opposite ends of body 102. Flanges 104 curve and taper off at their respective distal ends, however, such extrusion features can be formed into a wide variety of shapes, sizes, and orientations due to the flexibility of extrusion processing. In addition, body 102 includes two protrusions or fingers 106. As illustrated in FIG. 1, fingers 106 are positioned along the length of body 102 and disposed on an upper face 110.

Generally, such extruded barriers are configured to be secured in a cavity. A barrier, such as barrier 100, can be secured using one or more extrusion features, or secured using a secondary fastener, such as fastener 120. Fastener 120 secures barrier 100 in place within cavity 200. Fastener 120 is typically a mechanical fastener used to secure barrier 100 within a desired location within a cavity 200. Fastener 120 can be a screw, a flanged pin, or the like to secure barrier 100 within cavity 200. Body 102 can also include an aperture 108 that receives fastener 120. Fastener 120 can include a flanged or barbed plastic insert 124 having a head 122. As illustrated in FIG. 1, head 122 is larger than aperture 108, while insert 124 is sized such that insert 124 can be received through aperture 108.

An extruded barrier, such as barrier 100, can be formed and shaped to conform to a particular cavity, or formed to generally fit within a wide variety of differently shaped cavities. As shown in FIG. 1, barrier 100 is configured to generally conform to the contours of a cavity 200, which is defined by cavity wall 210. Cavity 200 is formed from one or more cavity walls 210, and can include one or more openings 220 to receive fastener 120. Barrier 100 can be approximately 50 mm long, and approximately 20 mm wide. Of course, such dimensions can vary widely and can depend on a particular application and cavity. The flexibility of extrusion processes allows a manufacturer to easily change the shape and dimensions of any barrier, including barrier 100. In addition, because barrier 100 is an extruded part, it can be cut to almost any desired length, which will generally depend on the particular cavity to be filled by barrier 100.

Figure 2:
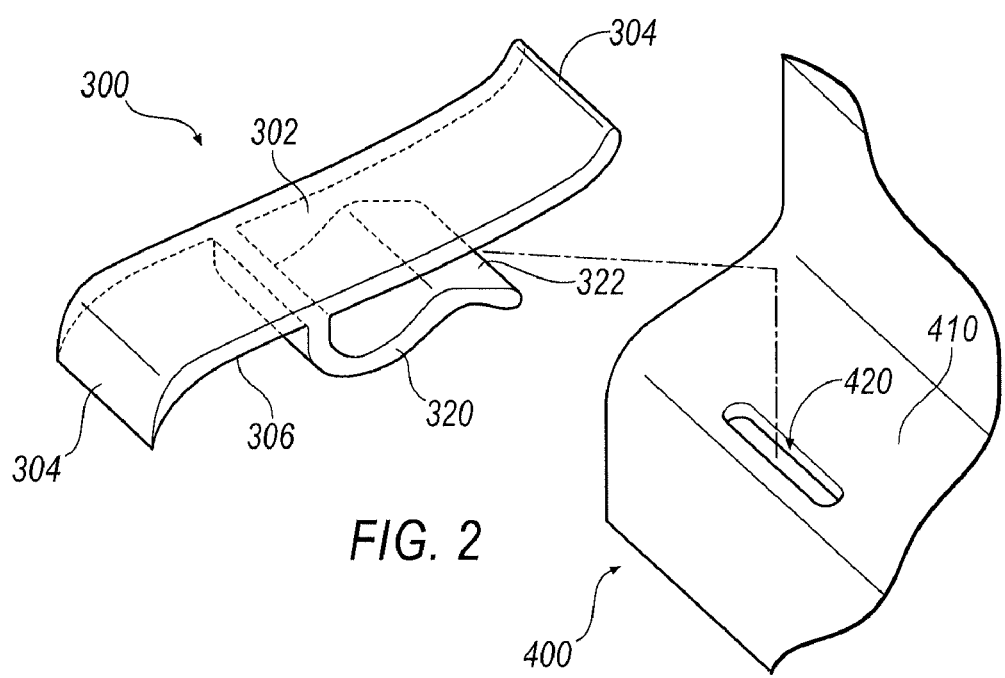
FIG. 2 is a perspective view of an expandable barrier with a tab.

FIG. 2 illustrates another example of an extruded expandable barrier 300. FIG. 2 is a perspective view of barrier 300, and also illustrates another example of a cavity 400. As shown in FIG. 2, expandable barrier 300 is also an extruded part having a generally rectangular body 302 with several extrusion features. As illustrated in FIG. 2, body 302 includes two curved flanges 304 disposed at opposing ends of body 302. Barrier 300 can also include one or more protrusions or fingers along its length (not shown), similar to barrier 100.

Barrier 300 also includes a curved hook or tab 320 that acts as an integrated fastener, securing barrier 300 in place within cavity 400. As shown in FIG. 2, tab 320 is configured to mate with a slot 420 in a cavity wall 410. Typically, tab 320 and slot 420 will create an interference or friction fit to releasably secure barrier 300 in place within cavity 400. Tab 320 can be designed accordingly to mate with a wide variety of slot designs, or to mate with a seam within a cavity. For example, tab 320 is substantially similar in width to body 302 and includes a bent end portion 322 that further secures barrier 300 to cavity wall 400. Tab 320 extends some distance away from body 302, and is oriented substantially parallel with body 302. In addition, tab 320 can be designed to retain barrier 300 in place within different parts of a vehicle, or to secure barrier 300 in a particular orientation within a cavity. The use of tab 320 and slot 420 can eliminate the need to use a secondary, mechanical fastener to secure barrier 300 in place.

Figure 3:
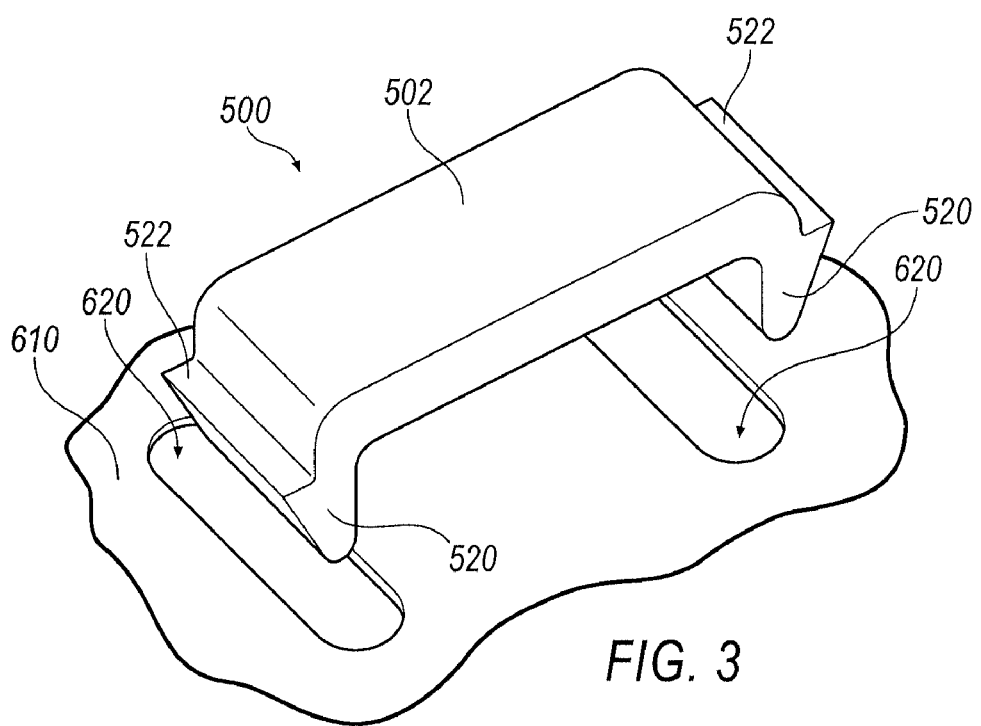
FIG. 3 is a perspective view of an expandable barrier with a snap-in tab.

FIG. 3 is a perspective view of yet another example of an extruded expandable barrier 500. As shown, barrier 500 is disengaged from a cavity wall 610, but capable of being releasably secured to a cavity wall 610. Barrier 500 includes an elongated, generally "C" shaped body 502. Barrier 500 also includes two integrated snap-in tabs 520 disposed about the distal ends of body 502 and oriented perpendicular to body 502. Tabs 520 are configured to releasably secure barrier 500 to cavity wall 610. Snap-in tabs 520, as shown, are configured to mate with complementary slots 620 formed in cavity wall 610. Each snap-in tab 520 includes a shelf 522 that can compress to fit through slot 620, and then expand on the opposite side of slot 620 to releasably secure barrier 500 in place.

Figure 4:
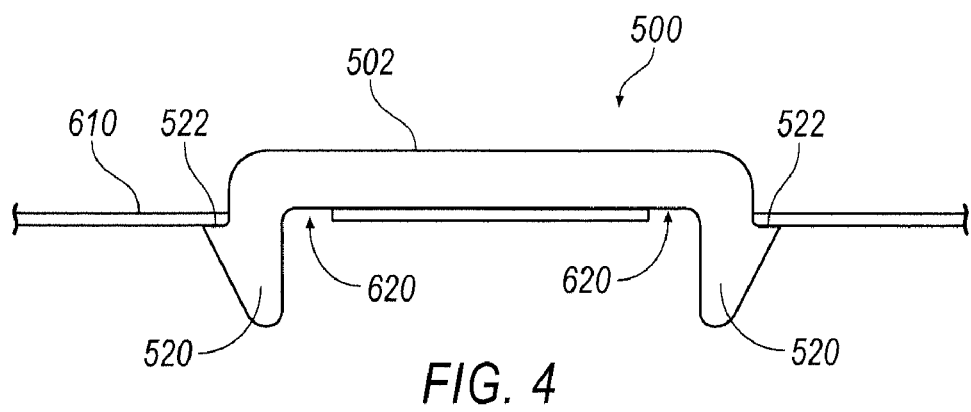
FIG. 4 is a side view of the expandable barrier shown in FIG. 3.

FIG. 4 is a profile view of barrier 500 shown engaging cavity wall 610. To releasably secure barrier 500 in place, snap-in tabs 520 are pushed through slots 620. Snap-in tabs 520 are shaped and configured to deform, thereby allowing snap-in tabs 520 to pass through slots 620. Snap-in tabs 520 are also resilient, such that once they pass through slots 620, snap-in tabs 520 substantially return to their pre-deformed position and orientation, thereby releasably securing barrier 500 in place within a cavity, without the need of a secondary, mechanical fastener.

Such a configuration also enables expandable material to be placed on both sides of a cavity wall. In certain applications, it may be desirable to place expandable material on two sides of a cavity wall with the use of only one barrier, such as barrier 500. Such a design also reduces or eliminates the need to use spray-in foam to fill and seal a difficult to reach second cavity that shares a wall with a first cavity.

Figure 5:
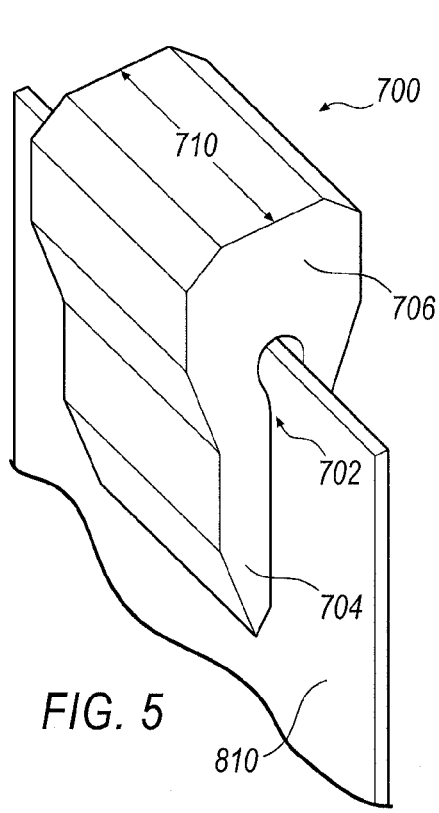
FIG. 5 is a perspective view of an expandable barrier configured to engage a formation.
Figure 6:
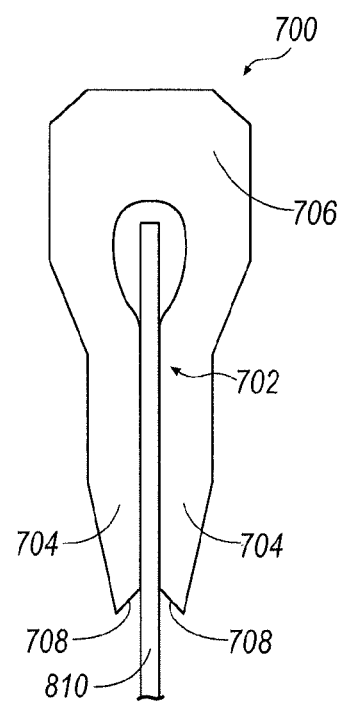
FIG. 6 is a side view of the expandable barrier shown in FIG. 5.

FIG. 5 is a perspective view of an expandable barrier 700 that is configured to engage a formation 810 in a cavity, and FIG. 6 is a side view showing the same. As shown, barrier 700 is an extruded expandable barrier that includes a center cut or gap 702 that is configured to engage a formation 810 found in a cavity. For example, formation 810 can be a protruding flange of sheet metal or steel found in a cavity. As shown, barrier 700 includes two resilient flanges 704 that are connected by a top portion 706. Due to the resilient nature of the extruded expandable material, flanges 704 can move away from one another, thereby expanding gap 702. Flanges 704 can then be placed around various formations of different shapes and sizes. Due to the resilient nature of flanges 704, once placed around formation 810, flanges 704 releasably securing barrier 700 in place by contracting and creating an interference or friction fit around formation 810. Barrier 700 can also include lead-ins 708 that facilitate assembly. As shown, lead-ins 708 are angled away from formation 810 to allow barrier 700 to slide over formation 810. Thus, should barrier 810 be sloped or include a burr or other obstacle, lead-ins 708 can ride over such an obstacle and facilitate easy assembly by facilitating flanges 704 to also move over such obstacles.

Such a configuration may eliminate the need to use a secondary, mechanical fastener to secure barrier 700 in place in certain cavities that include various shapes and sizes of formation 810. Furthermore, such a configuration also enables expandable material to be placed on both sides of formation 810. Because barrier 700 is an extruded part, it can be cut to almost any desired length 710 to fit a wide variety of applications without any change in tooling. Furthermore, barrier 700 can be shaped accordingly to provide a desired amount of expandable material depending on the size and shape of the cavity to be sealed. For example, the dimensions of flanges 704 and top portion 706 can vary dramatically to provide a desired amount of expandable material in a desired location. In addition, the size, shape, and profile of gap 702 can vary dramatically to conform to the size, shape, and profile of formation 810, which can be a single sheet of steel, multiple sheets of steel, a steel tab, or the like.

Figure 7:
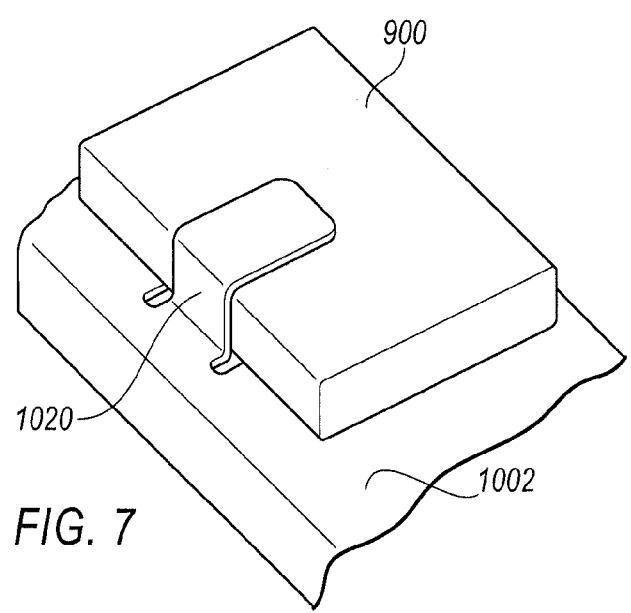
FIG. 7 is a perspective view of an expandable barrier releasably secured to a cavity wall.

FIG. 7 is a perspective view of an expandable barrier 900 that is releasably secured to a cavity wall 1002. As shown, barrier 900 is a simple block of expandable material that can be releasably secured to cavity wall 1002 through the use of a retention tab 1020 formed in a cavity wall 1002. Retention tab can be cut from or welded to cavity wall 1002, and can be resilient or deformable to releasably secure barrier 900 in place within a cavity. For example, retention tab 1020 can be pre-bent to create an interference fit with barrier 900. Retention tab 1020 can also be formed at a 90° angle from cavity wall 1002 and then bent over barrier 900. The use of retention tab 1020 also eliminates the need for a secondary mechanical fastener to secure barrier 900 in place.

As previously discussed, an infinite number of other variations of the illustrated preferred embodiments are contemplated to be included in the scope of the following claims. For example, while several specific examples of barriers are shown, the disclosed extruded barriers are capable of being formed, shaped, cut, and otherwise manipulated into many shapes, sizes, and configurations. Furthermore, various post-extrusion processes can also be used to further configure a barrier. For example, barriers can be cut, trimmed, or drilled or punctured to create holes, notches, or other physical features. A barrier can include structures or features to facilitate the handling or movement of the barrier by robots or structures to facilitate installation.

A barrier may include a second material as well, such as a pre-activation sealer material. A barrier may include a placement area in the form of a ridge on which pre-activation sealer material may be placed. In addition, other structures may be used to accept the sealer material such as ledges, troughs and wells. The placement area may also serve other purposes or functions besides receiving the pre-activation sealer material such as directing the activated sealer material or ensuring that the barrier is properly fit in to the orifice.

We claim:

1. An expandable barrier comprising:
   an elongated body that is substantially rectangular;
   a first tab that is configured to releasably secure the body to a cavity wall by deforming and establishing an interference fit with the cavity wall, wherein the body and the tab are integrally formed by extruding a thermoplastic expandable material; and
   a second tab, wherein the tabs are substantially parallel flanges separated by a gap and connected by a top portion, the tabs being resilient and configured to deform away from one another and releasably engage a formation;
   wherein the formation includes a first side and a second side, and the tabs are configured to provide a portion of thermoplastic expandable material on both the first and second sides of the formation; and
   wherein the tabs each include an angled end face that is angled away from the opposing tab in a direction moving away from the top portion.

2. The expandable barrier of claim 1, further comprising a pair of curved flanges disposed at opposing distal ends of the body.

3. The expandable barrier of claim 1, wherein the first tab is configured to mate with a complementary slot in the cavity wall thereby securing the barrier to the cavity wall by creating an interference fit.

4. The expandable barrier of claim 3, wherein the first tab further comprises a shelf that deforms to fit through the complementary slot in the cavity wall, and expands to releasably secure the barrier in place.

5. The expandable barrier of claim 1, wherein the first tab further comprises a deformable curved end portion that further secures the body to the cavity wall.

6. The expandable barrier of claim 1, wherein the body is disposed on a first side of the cavity wall, and the first tab is further configured to provide a portion of thermoplastic expandable material on a second side of the cavity wall.

7. The expandable barrier of claim 1, wherein the first tab is oriented substantially parallel to the body.

8. The expandable barrier of claim 1, wherein the tabs are disposed at opposing distal ends of the body, and each is oriented substantially perpendicular to the body.

9. The expandable barrier of claim 1, further comprising a lead-in disposed at a distal end of the first tab, wherein the lead-in includes the angled face, wherein the angled end face is angled away from the cavity wall.

10. The expandable barrier of claim 1, further comprising a mechanical fastener disposed through an aperture in the body.

11. The expandable barrier of claim 1, wherein the thermoplastic expandable material is a heat activated expandable material.

12. The expandable barrier of claim 1, wherein the body and at least one of the tabs are substantially similar in width.

13. The expandable barrier of claim 1, wherein the formation is a protruding flange of sheet metal in a cavity.

* * * * *